Patented Apr. 18, 1950

2,504,839

UNITED STATES PATENT OFFICE 2,504,839

ORGANO-SILOXANES AND METHODS OF PREPARING THEM

James Franklin Hyde, Corning, N. Y., assignor to Corning Glass Works, Corning, N. Y., a corporation of New York No Drawing. Application February 19, 1946, Serial No. 648,813

4 Claims. (Cl. 260—46.5)

This invention relates to new compositions of matter and their preparation and, more particularly, to organo-siloxanes and methods of preparing them.

This application is a continuation-in-part of my copending applications Serial Number 432,528 filed February 26, 1942 now Patent 2,486,162 and Serial Number 518,371 filed January 15, 1944 now Patent 2,450,594, both being assigned to the assignee of the present invention.

Organo-mono-silanes having the general formula RSiXYZ may be prepared by means of the well-known Grignard reaction, where R represents an organic radical which is capable of reacting with magnesium to form Grignard reagents and which is attached to silicon through carbon-silicon linkage and where X, Y and Z represent the same or different readily hydrolyzable radicals such as hydrogen, halogens, alkoxy, aroxy, acyloxy, etc. By hydrolyzable radical is meant, in general, any radical which is attached to silicon by other than carbon-silicon linkage and which under the same set of conditions is more readily hydrolyzed than an organic radical directly attached to silicon through carbon-silicon linkage. Such organo-silanes are hydrolyzed on treatment with water. Concurrent dehydration or condensation with splitting out of water occurs so that a partially dehydrated product results which can be further dehydrated by heat.

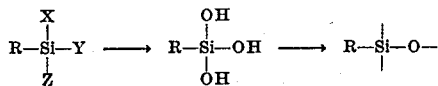

The formation of a siloxane linkage, i. e. Si—O results from the close approach of two hydroxyl groups and subsequent elimination of water. It may also result from the close approach of one hydroxyl group to a hydrolyzable group such as halogen, acyloxy, or alkoxy and subsequent elimination of a hydrogen halide, a carboxylic acid or an alcohol, respectively. Such eliminations are catalyzed by mineral acids, especially hydrochloric and sulphuric acids, and alkali metal hydroxides, especially sodium hydroxide. It will be seen that in each structural unit one of the four silicon bonds is blocked by the organic radical R, and three siloxane linkages can form. Such compounds are, accordingly, capable of three-dimensional polymerization.

I have found that the properties of the above hydrolysis products depend upon the kind of organic radical which is attached to the silicon. Certain organic radicals possess desirable properties not possessed by others. For example, it is easier to control the hydrolysis and condensation of phenyl silicon trichloride than methylsilicon trichloride, presumably because of the larger size of the phenyl group. Even within a given class of radicals, for example, the alkyls, there is a variation in properties. Accordingly, it is desirable to have different kinds of radicals present in the same product in order to obtain the desired combination of properties. It is also desirable not only to have different kinds of radicals, but also to predetermine the relative proportions of the various radicals in the product. With such compositions, a great variation of properties could be obtained and products could be perpared for specific applications.

An object of this invention is the production of new and useful products which will have desirable predetermined properties.

Another object of this invention is to provide a method of preparing improved mono-organosiloxanes.

Another object is to provide a mono-organosiloxane containing at least two chemically different structural units.

A still further object of my invention is to provide low melting thermoplastic copolymeric mono - organo - siloxanes comprising essentially oxygen atoms and chemically different units corresponding to the general formulae $C_6H_5Si\equiv$ and $RSi\equiv$, respectively, where R is a higher alkyl radical having at least 7 carbon atoms, said units being connected by said oxygen atoms through silicon-oxygen linkages.

The new method comprises hydrolyzing a mixture containing a silane of the formula $C_6H_5SiX_3$ and a silane of the formula $RSiY_3$, where R represents a higher alkyl radical having at least 7 carbon atoms and where X and Y are the same or different hydrolyzable radicals attached to silicon by other than carbon-silicon linkages such as halogens and alkoxy radicals, and dehydrating the hydrolysis product. It is to be understood that each of the silanes is present in appreciable quantity, i. e., in amount sufficient to produce a perceptible effect on the properties of the resulting inter-condensate.

One method of accomplishing the inter-condensation of the mixture of silanes of this invention is to hydrolyze said mixture slowly with water which is dissolved in more than twice its volume of a common solvent such as alcohol, ether, dioxan, acetic acid, acetone, etc. Although a difference in the reactivity of the silane components and a variation in the amounts present in the initial mixture may make it desirable to vary the conditions of the process, the above recited procedure in general is to be preferred. The use of a solvent which is completely or partially miscible with water for diluting the hydrolyzable mixture or the water or both insures the maintenance of homogeneity during hydrolysis. Under these conditions condensation or the formation of siloxane linkages occurs concurrently with the hydrolysis, but it is to be understood that the extent of further subsequent dehydration is optional and will depend largely upon the use to which the product will be put. Also in order to better control the properties of the resulting product it is desirable to have the starting materials substantially pure, or at least free of other hydrolyzable compounds which tend to produce unwanted copolymeric combinations.

Hydrolysis of a hydrolyzable mixture of mono-organo-silanes and dehydration of the hydrolysis product will result in inter-condensation or formation of inter-connecting oxygen linkages between the silicon atoms of the mono-organo-substituted silanes. If the hydrolyzable groups of the silanes in the mixture to be hydrolyzed are halogens, it is preferable to employ dioxan as the solvent because it is inert to the halogens. If the mixture contains both halogens and alkoxy groups the former can be converted to the latter by the slow addition of dry alcohol to the mixture, or the mixture can be diluted with dioxan and treated with aqueous alcohol. When the mixture contains only alkoxy groups any water miscible solvent may be used together with a trace of acid such as hydrochloric acid as catalyst. In this case, alcohol may be preferred on account of its relatively low cost. Mixtures of water miscible solvents may be used.

The products obtained as a result of the hydrolysis of the mixture of silanes of this invention without further dehydration at elevated temperatures are in general low molecular weight materials which are low melting thermoplastic wax-like solids. These are useful for lubricating glass surfaces such as glass fibers, particularly during the manufacture of glass yarn from such fibers when it is important to prevent abrasion of the freshly formed fibers with resulting fraying and fuzzing thereof. When the low molecular weight hydrolysis products are heated at temperatures above 200° C. for several hours, resinous solids may be formed which, when mixed with pigments, yield useful high temperature paints. If desired, the properties of the above products may be modified by incorporating therein other organo-silicon oxide units such as mono-methyl silicon oxide by including the appropriate silane in the original silane mixture. By such incorporation, a product may be modified to suit particular applications.

The following examples will illustrate the mode of operation of the process and the character of the resulting products.

Example 1

One gram of dodecylsilicon trichloride and 6.3 grams of phenylsilicon trichloride were added to 10 grams of anhydrous ethyl alcohol. Homogeneity resulted after the addition of 5 grams of "cellosolve" ($C_2H_5OCH_2CH_2OH$). An excess of water was added dropwise. A soft tacky resin remained after solvent removal. On heating for a short time at 265° C., films on glass and metal were still somewhat soft. Further heating caused the films to become very hard. Mixed with pigments the products gave a good high-temperature paint.

Example 2

Eleven grams of anhydrous ethyl alcohol were added to a mixture of one gram dodecylsilicon trichloride and 2.09 grams of phenylsilicon trichloride. After the evolution of HCl had largely stopped 0.36 gram of water (1½ mole per mole of mixed chlorides) were added dropwise with shaking. The resin is liquid while hot after one hour heating at 175° C. On heating for sixteen hours at 265° C. the sample had set. This product with pigments gave good high-temperature paints.

Example 3

A solution of $C_6H_5SiCl_3$ and $C_{12}H_{25}SiCl_3$ in the molar proportions of 2:1 was diluted with approximately twice its volume of dioxan and then hydrolyzed and inter-condensed by the slow addition of a 1:3 solution of water in dioxan. After removing the solvent, a hard brittle resinous film was obtained after one hour at 190° C.

Example 4

A mixture of 50 mole per cent each of $C_6H_5SiCl_3$ and $C_{18}H_{37}SiCl_3$ was hydrolyzed by adding the mixture with agitation and at a temperature below 30° C. to a hydrolysis solution containing water in slight excess of that required to effect complete hydrolysis, and ethyl alcohol equal to twice the volume of water. At the end of the addition, the temperature was raised sufficiently to cause refluxing as rapidly as permitted by the evolution of HCl. The reaction mixture was held just under reflux temperature for 2½ hours. It was then diluted with toluene and washed four times to remove acid. A soft semi-wax-like product may then be obtained by removing the solvents and excess water.

I claim:

1. A copolymeric organosiloxane which is composed of from 50 to 95 mol percent structural units $C_6H_5SiO_{3/2}$ and 5 to 50 mol percent structural units $RSiO_{3/2}$, where R is higher alkyl radical having at least seven carbon atoms, the silicon atoms of said organo-siloxane being joined together by oxygen atoms through siloxane linkages.

2. A copolymeric organosiloxane which is composed of from 50 to 95 mol percent structural units $C_6H_5SiO_{3/2}$ and from 5 to 50 mol percent structural units $RSiO_{3/2}$, where R is a higher alkyl radical having from 12 to 18 carbon atoms, the silicon atoms being joined together by the oxygen atoms through siloxane linkages.

3. A copolymeric organosiloxane which is composed of from 50 to 95 mol percent structural units $C_6H_5SiO_{3/2}$ and from 5 to 50 mol percent structural units $C_{12}H_{25}SiO_{3/2}$, the silicon atoms of said organo-siloxane being joined together by oxygen atoms through siloxane linkages.

4. A copolymeric organosiloxane which is composed of from 50 to 95 mol percent structural units $C_6H_5SiO_{3/2}$ and from 5 to 50 mol percent structural units $C_{18}H_{37}SiO_{3/2}$, the silicon atoms of said organosiloxane being joined together by oxygen atoms through siloxane linkages.

JAMES FRANKLIN HYDE.

REFERENCES CITED

The following references are of record in the file of this patent:

UNITED STATES PATENTS

| Number | Name | Date |
| --- | --- | --- |
| 2,258,222 | Rochow | Oct. 7, 1941 |

OTHER REFERENCES

Andrianov, J. Gen. Chem., U. S. S. R., vol. 8, 1938, pages 1255 to 1263.

Meads et al., Chem. Soc. Journal, vol. 107, 1915, Trans. Part I, pages 459 to 468.